United States Patent
Suzuki

(10) Patent No.: US 7,083,220 B2
(45) Date of Patent: Aug. 1, 2006

(54) VEHICLE HAVING A BODY STRUCTURE, WHICH INCLUDES A RECEPTACLE CONTAINING A WINDOW REGULATOR

(75) Inventor: Yoichiro Suzuki, Ichikai-machi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/059,547

(22) Filed: Feb. 17, 2005

(65) Prior Publication Data

US 2005/0184557 A1 Aug. 25, 2005

(30) Foreign Application Priority Data

Feb. 19, 2004 (JP) ............................. 2004-042947

(51) Int. Cl.
*B60J 1/18* (2006.01)
(52) U.S. Cl. ................ 296/146.16; 296/89; 296/190.1; 296/201
(58) Field of Classification Search ........... 296/146.16, 296/146.8, 146.2, 146.15, 89, 190.11, 190.1, 296/57.1, 146.1, 200, 201; 49/502
See application file for complete search history.

(56) References Cited

U.S. PATENT DOCUMENTS

| | | | | | |
|---|---|---|---|---|---|
| 4,119,341 | A | * | 10/1978 | Cook .................... | 296/146.16 |
| 4,411,466 | A | * | 10/1983 | Koike .................... | 296/146.6 |
| 4,793,099 | A | * | 12/1988 | Friese et al. ............ | 49/380 |
| 6,422,638 | B1 | * | 7/2002 | Carnaghi et al. ........ | 296/146.16 |
| 6,481,772 | B1 | * | 11/2002 | Tenn ...................... | 296/26.11 |
| 6,513,863 | B1 | * | 2/2003 | Renke et al. ........... | 296/190.11 |
| 6,572,176 | B1 | * | 6/2003 | Davis et al. ............ | 296/146.16 |
| 6,786,535 | B1 | * | 9/2004 | Grzegorzewski et al. .................... | 296/190.11 |

* cited by examiner

*Primary Examiner*—D. Glenn Dayoan
*Assistant Examiner*—Greg Blankenship
(74) *Attorney, Agent, or Firm*—Birch, Stewart, Kolasch & Birch, LLP

(57) ABSTRACT

A vehicle includes a first panel member, which defines a cabin, and second panel member, which is disposed to face the first panel member from outside of the cabin. The second panel member and the first panel member form a receptacle therebetween. The receptacle contains a window regulator. The first panel member includes a first portion which separates the cabin and the receptacle from each other, and a second portion which separates inside and outside of the cabin from each other. The second panel member covers the first portion of the first panel member from outside of the cabin and is fixed to the second portion.

9 Claims, 4 Drawing Sheets

VEHICLE HAVING A BODY STRUCTURE, WHICH INCLUDES A RECEPTACLE CONTAINING A WINDOW REGULATOR

CROSS-REFERENCE TO RELATED APPLICATIONS

This application is based upon and claims the benefit of priority from prior Japanese Patent Applications No. 2004-042947, filed Feb. 19, 2004, the entire contents of which are incorporated herein by reference.

BACKGROUND OF THE INVENTION

1. Field of the Invention

The present invention relates to a vehicle having a body, which includes a window regulator, and more particularly to a body structure for holding the window regulator.

2. Description of the Related Art

A pickup truck, as an example of automobiles, has a cabin and a loading platform located behind the cabin. The cabin has a rear window. The rear window is formed of a window frame and a windowpane of glass, and supported by an outer panel which defines the cabin.

In the case where the windowpane of the rear window can be moved up and down, the window frame has a slit-shaped opening, through which the windowpane is moved in and out of the body. A window regulator which moves up and down the windowpane is disposed inside the outer panel, and located under the rear window. In this structure, if, for example, rainwater enters the above-mentioned opening of the window frame, it may leak in the cabin along the outer panel.

To avoid entrance of the water, conventionally, the cabin has an inner panel which faces the outer panel from the interior of the cabin. The inner panel is connected to, for example, the left and right rear pillars constituting the cabin, by means of welding or the like. The inner panel and the outer panel form a receptacle. The receptacle is a space isolated from the cabin and holds the window regulator. Since the receptacle is continuous to the opening through which the windowpane is moved in and out of the body, it is impossible to prevent rainwater from entering the receptacle. Therefore, the conventional receptacle has a drainage hole in a lower end portion of the outer panel.

The drainage capacity of the drainage hole is naturally limited. Therefore, for example, in the case of a heavy rainfall, the amount of rainwater flowing in the receptacle may be greater than the amount of rainwater discharged through the drainage hole, and the rainwater may remain in the receptacle. If the rainwater remains in the receptacle, it may leak in the cabin through joint portions connecting the inner panel and the rear pillars.

To prevent the water leakage, a complicated waterproof structure, using a sealing material, is required. If the sealing material is deteriorated or damaged, however, the water leakage into the cabin cannot be prevented.

In view of this, the present invention provides a vehicle, in which water leakage into the cabin from a receptacle containing a window regulator is reliably prevented.

SUMMARY OF THE INVENTION

A vehicle according to an aspect of the present invention comprises: a first panel member, which defines a cabin; a second panel member, which is disposed to face the first panel member from outside of the cabin, the second panel member and the first panel member forming a receptacle therebetween; and a window regulator contained in the receptacle. The first panel member includes a first portion which separates the cabin and the receptacle from each other, and a second portion which separates inside and outside of the cabin from each other. The second panel member covers the first portion of the first panel member from outside of the cabin and is fixed to the second portion.

In the above structure, the fixing portion which fixes the first panel member and the second panel member is located outside the cabin. As a result, even if water in the receptacle passes through the fixing portion, the water flows out of the cabin. Thus, the inside of the cabin is separated from the receptacle in a watertight manner only by fixing the first panel member to the second panel member. Consequently, water leakage from the receptacle into the cabin can be prevented without using a special sealing member.

In the above aspect of the present invention, it is preferable that the first portion of the first panel member includes a recess portion, which is recessed into the cabin from the second portion, and the second panel member has a shape defining an outer shape of the cabin and forms the receptacle in conjunction with the recess portion. In this structure, since the second panel member defining the outer shape of the vehicle covers the recess portion, the receptacle for holding the window regulator can be formed without changing the appearance of the vehicle. In addition, water leakage from the receptacle into the cabin can be prevented without impairing appearance of the vehicle.

In the above aspect of the present invention, it is preferable that the second panel member be provided with a drainage hole which is open to the receptacle.

In the above aspect of the present invention, it is preferable that the second portion of the first panel surround the first portion.

In the above aspect of the present invention, it is preferable that the first panel member be fixed to a body member forming the cabin.

A vehicle according to another aspect of the present invention comprises: a body member forming a cabin; a first panel member, which is fixed to the body member and separates the cabin from a loading platform; a second panel member, which is disposed to face the first panel member from a direction of the platform, the second panel member and the first panel member forming a receptacle therebetween; and a window regulator contained in the receptacle. The first panel member includes a first portion which is recessed into the cabin, and a second portion which surrounds the first portion. The second panel member has a third portion which forms the receptacle in conjunction with the first portion, and a fourth portion fixed to the second portion.

In the above structure, the fixing portion which fixes the first panel member and the second panel member is located around the receptacle outside the cabin. As a result, even if water in the receptacle passes through the fixing portion, the water flows out of the cabin. Thus, the inside of the cabin is separated from the receptacle in a watertight manner only by fixing the second portion of the first panel member to the fourth portion of the second panel member. Consequently, water leakage from the receptacle into the cabin can be prevented without using a special sealing member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described with reference to FIGS. 1 to 5.

Figure 1:
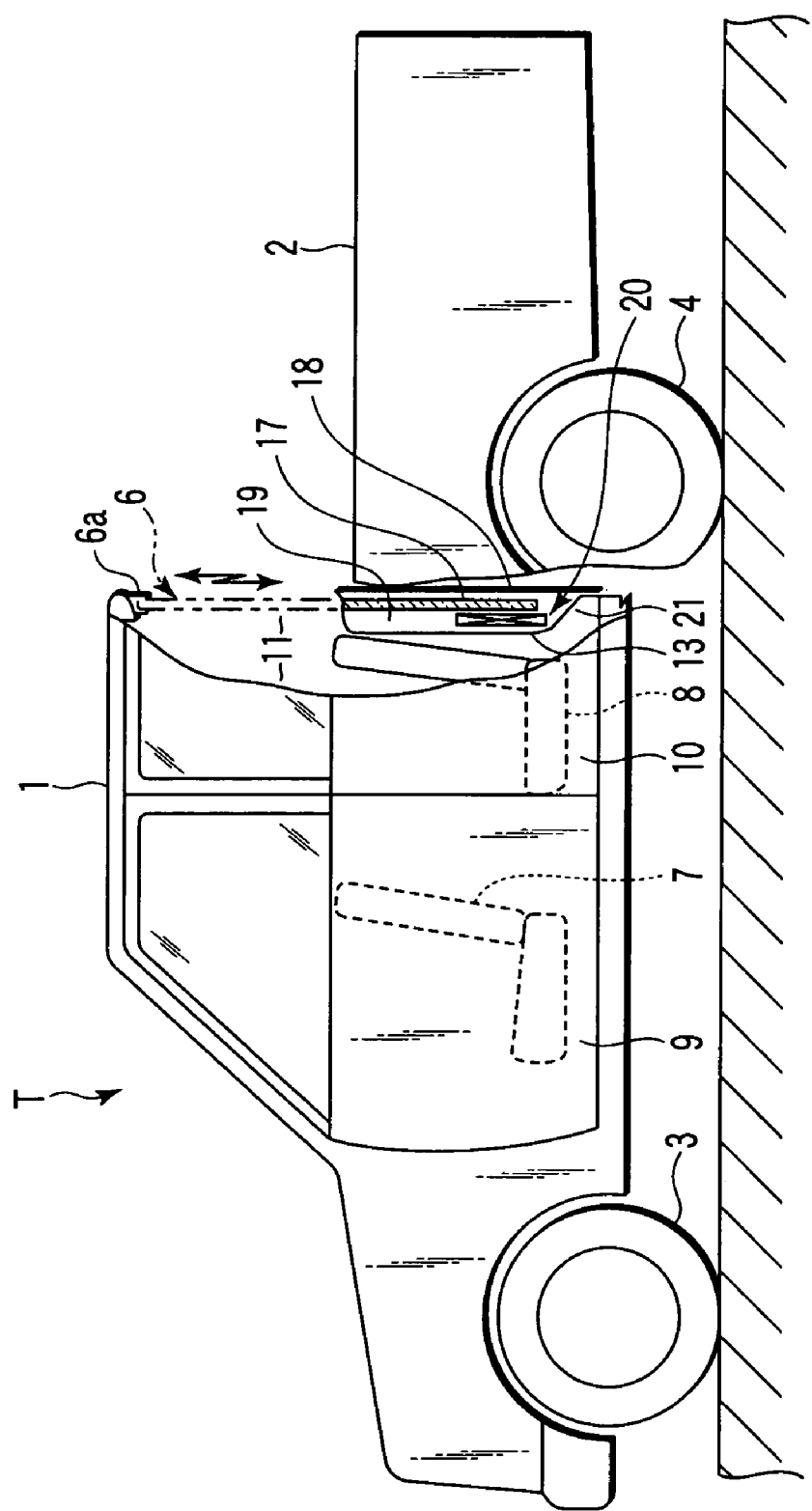
FIG. 1 is a side view of a pickup truck according to an embodiment of the present invention, showing a boundary portion between a cabin and a loading platform in a cutaway.

FIG. 1 shows a pickup truck T as an example of an automobile. The body of the pickup truck T has a cabin 1 and a loading platform 2. The loading platform 2 is formed behind and inseparably from the cabin 1. Front wheels 3 are provided in a front end portion of the cabin 1. Rear wheels 4 are provided under the loading platform 2.

The cabin 1 has a front window (not shown) and a rear window 6. The front window is located in the front end of the cabin 1. The rear window 6 is located in the rear end of the cabin 1. A front seat 7 and a rear seat 8 are provided in a vehicle compartment 11 defined inside the cabin 1. The front seat 7 and the rear seat 8 are arranged fore-and-aft in the compartment 11. The rear window 6 is located immediately behind the rear seat 8.

Further, the cabin 1 has a plurality of openings (not shown) through which passengers get on and off the vehicle on the left and right sides of the compartment 11, and front doors 9 and rear doors 10 which open and close the openings. Therefore, the passengers can get on and off the compartment 11 from both left and right sides of the cabin 1.

Figure 2:
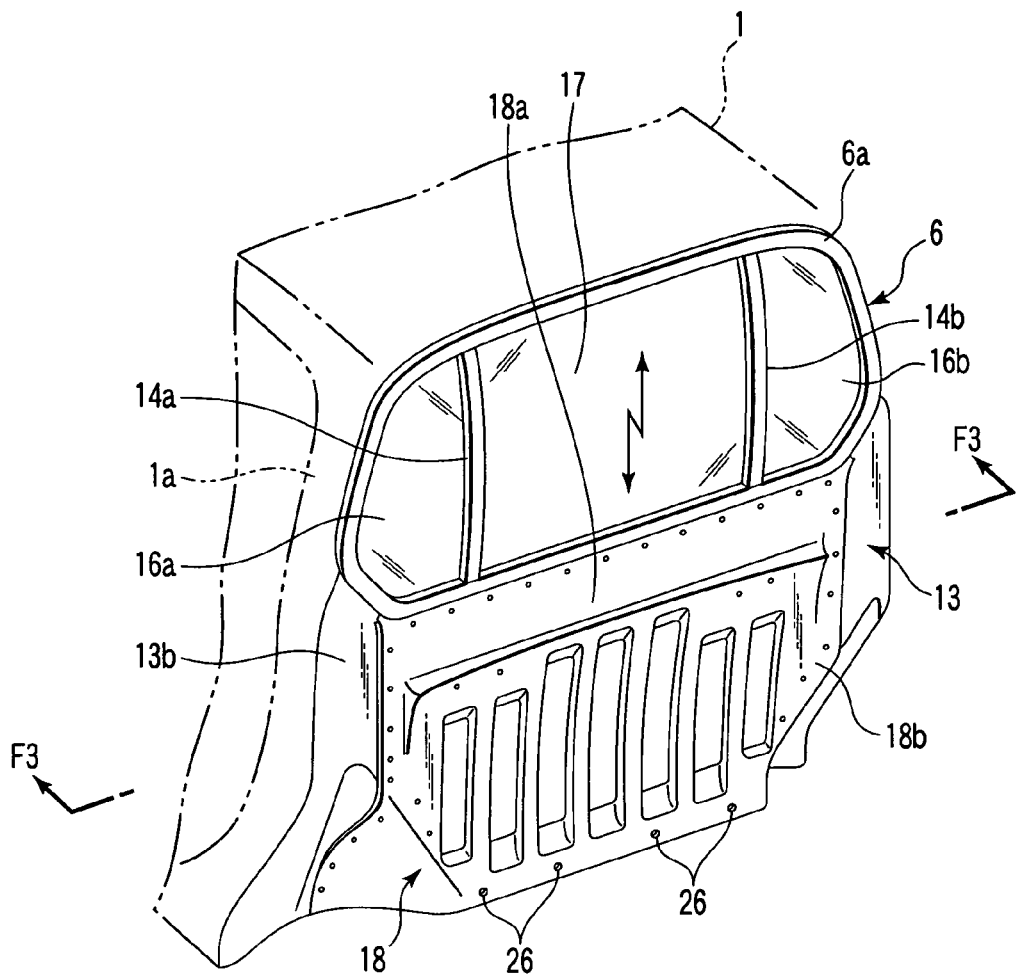
FIG. 2 is a perspective view of the pickup truck according to the embodiment, showing a rear outer panel, a cover panel and a rear window viewed from the position of the loading platform.

FIG. 2 shows the rear window 6 at the rear end of the cabin 1, as viewed from the position of the loading platform 2. The rear window 6 has a window frame 6a. The window frame 6a is supported by a rear outer panel 13 (a first panel member). The rear outer panel 13 separates the compartment 11 from the loading platform 2, and constitutes a rear wall of the cabin 1. Thus, the rear outer panel 13 defines a part of the outer shape of the cabin 1.

The rear outer panel 13 is located between a pair of rear pillars 1a and 1b. As indicated by a two-dot-chain line shown in FIG. 3, the rear pillars 1a and 1b are members of the vehicle body, which constitute a framework of the cabin 1. They are separated from each other in the width direction of the cabin 1. One end of the rear outer panel 13 is fixed to the rear pillar 1a by, for example, welding. Likewise, the other end of the rear outer panel 13 is fixed to the rear pillar 1b by, for example, welding.

Figure 4:
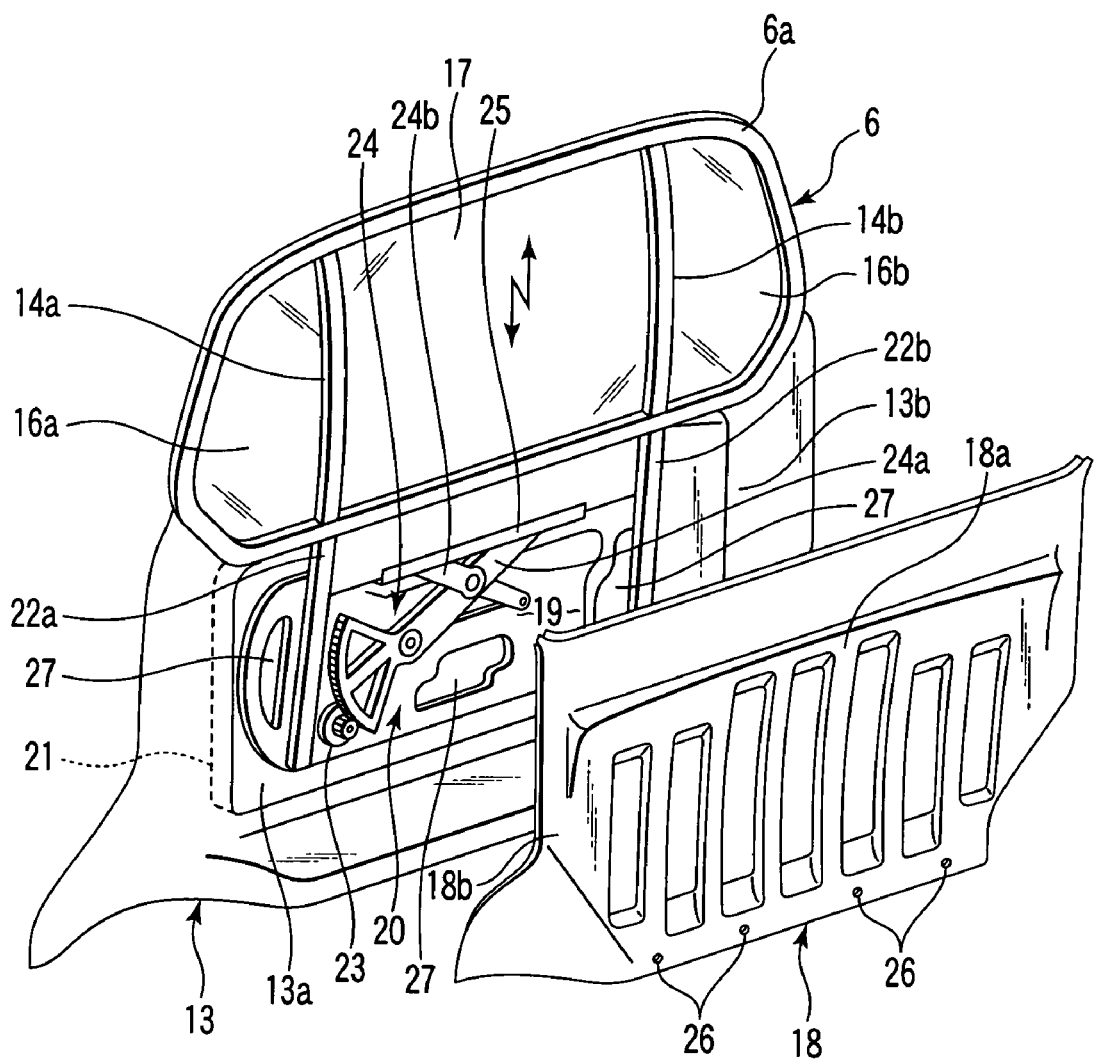
FIG. 4 is an exploded perspective view, showing the positional relationship among a window regulator, the rear outer panel having a recess portion, and the cover panel in the embodiment of the present invention.

As shown in FIGS. 2 and 4, the window frame 6a of the rear window 6 has a size covering the overall width of the cabin 1, and is located above the rear outer panel 13. The window frame 6a has a pair of sashes 14a and 14b. The sashes 14a and 14b extend in the height direction of the cabin 1, and are arranged parallel to each other with a distance therebetween in the width direction of the cabin 1. A built-in type first windowpane 16a is fitted to a region surrounded by the sash 14a and the left end of the window frame 6a. Likewise, a built-in type second windowpane 16b is fitted to a region surrounded by the sash 14b and the right end of the window frame 6a. Further, a movable third windowpane 17 is fitted to the window frame 6a between the sashes 14a and 14b. The third windowpane 17 is interposed between the first and second windowpanes 16a and 16b and movable in the height direction of the cabin 1, guided by the sashes 14a and 14b. In other words, only the third windowpane 17, located in the middle in the width direction of the rear window 6, is movable.

Figure 3:
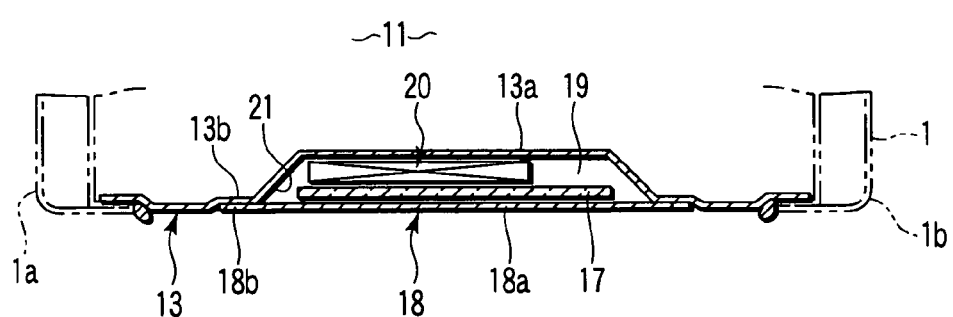
FIG. 3 is a sectional view taken along the line F3—F3 in FIG. 2.

As shown in FIG. 3, the rear outer panel 13 has a first portion 13a and a second portion 13b. The first portion 13a includes a recess portion 21, which is recessed toward the cabin 1. The recess portion 21 is located in a central portion of the rear outer panel 13 in the width direction thereof, and extends from a portion just under the lower end of the window frame 6a to a portion near the lower end of the rear outer panel 13. The second portion 13b of the rear outer panel 13 is located around the first portion 13a so as to surround the recess portion 21. Thus, the first portion 13a and the second portion 13b form a unitary structure.

As shown in FIG. 4, a pair of guide rails 22a and 22b is provided inside the recess portion 21. The guide rails 22a and 22b are continuous to the sashes 14a and 14b of the window frame 6a and protruded from the window frame 6a into the recess portion 21. The lower ends of the guide rails 22a and 22b are fixed to the bottom of the recess portion 21 by fixing members (not shown). The third windowpane 17 is interposed between the guide rails 22a and 22b, and slidably held by the guide rails 22a and 22b.

As shown in FIGS. 3 and 4, a cover panel 18 is disposed between the rear outer panel 13 and the loading platform 2. The cover panel 18, as an example of a second panel member, faces the rear outer panel 13 from the direction of the loading platform 2. In other words, the cover panel 18 faces the rear outer panel 13 from the outside of the cabin 1. The cover panel 18 has a size and shape suitable to cover the recess portion 21 of the rear outer panel 13.

More specifically, the cover panel 18 has a third portion 18a and a fourth portion 18b. The third portion 18a is located in a central portion of the cover panel 18, and covers the recess portion 21 of the rear outer panel 13 from the direction of the loading platform 2. The fourth portion 18b is located around the third portion 18a. The fourth portion 18b is fixed to the second portion 13b of the rear outer panel 13 by, for example, spot welding. As a result, a receptacle 19 is formed between the recess portion 21 of the rear outer panel 13 and the third portion 18a of the cover panel 18. The receptacle 19 is a flat space extending in the height direction of the cabin 1, and located just under the rear window 6. The first portion 13a of the rear outer panel 13 separates the compartment 11 from the receptacle 19 inside the cabin 1.

The second portion 13b of the rear outer panel 13 separates the compartment 11 from the outside of the cabin.

The receptacle 19 communicates with a slit (not shown) formed between the upper end of the cover panel 18 and the upper end of the recess portion 21. Therefore, the third windowpane 17, movable upward and downward, is moved in and out of the receptacle 19 through the slit. Further, a plurality of drainage holes 26 are formed in a lower end portion of the cover panel 18. The drainage holes 26 are open to the receptacle 19 in a bottom portion thereof.

Figure 5:
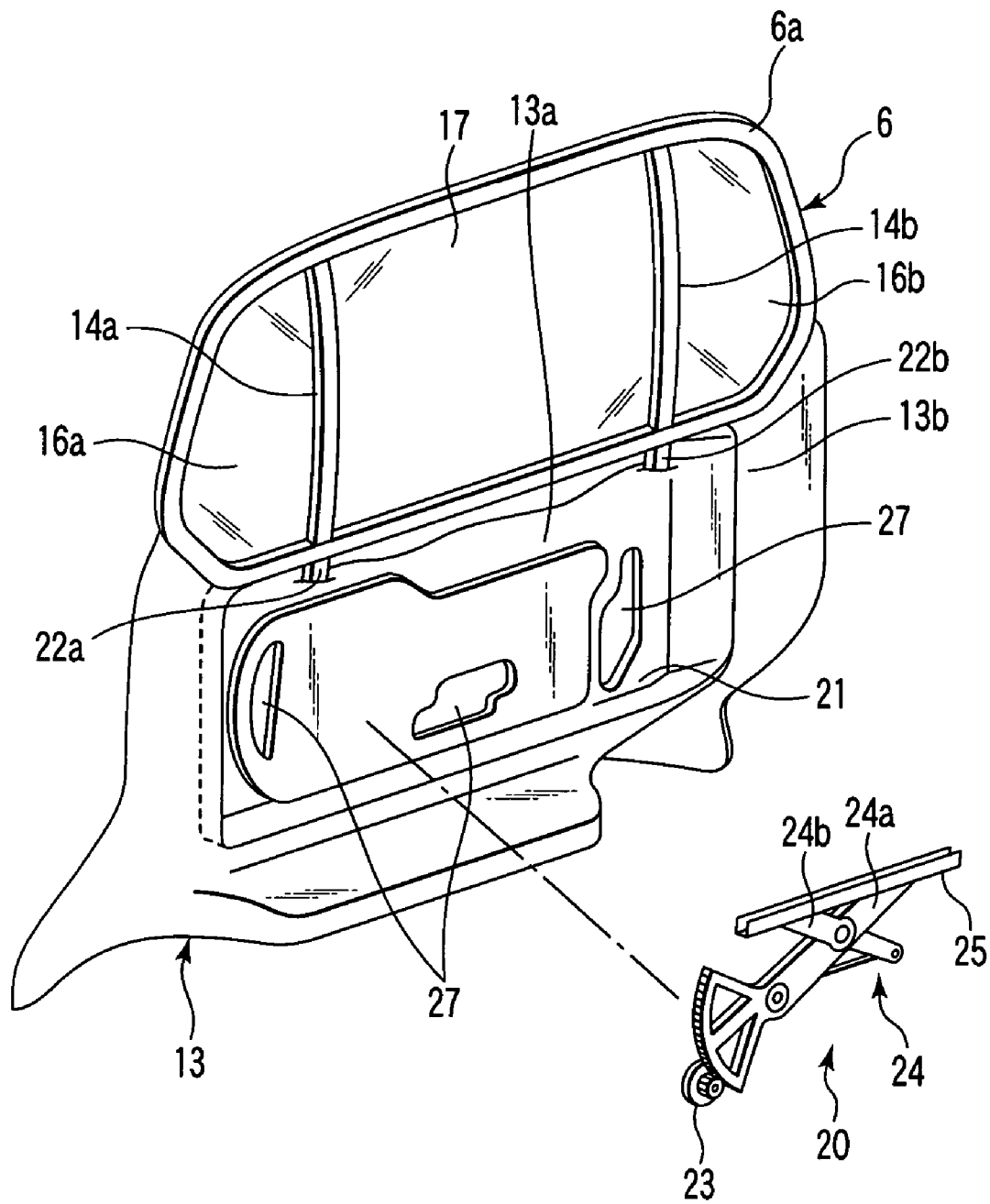
FIG. 5 is a perspective view showing the shape of the recess portion of the rear outer panel for holding the window regulator in the embodiment of the present invention.

As shown in FIGS. 3 and 4, the receptacle 19 contains a window regulator 20. The window regulator 20 moves the third windowpane 17 up and down. As shown in FIG. 5, the window regulator 20 includes a motor 23, a link mechanism 24 formed of a pair of links 24a and 24b coupled to form an X shape, and a support member 25 which supports the lower end of the third windowpane 17. The link mechanism 24 is interposed between the motor 23 and the support member 25. It converts torque generated by the motor 23 to a rectilinear motion and transmits it to the support member 25. As a result, the third windowpane 17 is moved up and down between a closed position in which the central portion of the rear window 6 is closed, and an open position in which the central portion of the rear window 6 is open.

As shown in FIGS. 4 and 5, a plurality of through holes 27 are formed in the bottom of the recess portion 21. The through holes 27 are used in maintenance of the window regulator 20 and other mechanisms contained in the receptacle 19. Each of the through holes 27 is closed by a removable closing member (not shown) made of, for example, a vinyl sheet or butyl rubber.

With the above structure, for example, when it rains, rainwater enters the receptacle 19 through the slit between the upper end of the cover panel 18 and the upper end of the recess portion 21. The rainwater that has entered the receptacle 19 is discharged through the drainage holes 26. If the amount of rainwater entering the receptacle 19 is greater than the amount of rainwater discharged through the drainage holes, the rainwater may remain in the receptacle 19.

The receptacle 19 is formed between the recess portion 21 in the rear outer panel 13 and the cover panel 18 fixed to the rear outer panel 13. The recess portion 21 separates the compartment 11 in the cabin 11 from the receptacle 19. In addition, the fourth portion 18b of the cover panel 18 is fixed to the second portion 13b of the rear outer panel 13. The second portion 13b of the rear outer panel 13 separates the compartment 11 from the outside of the cabin 1. Thus, the fixing portion which fixes the rear outer panel 13 and the cover panel 18 is located outside the cabin 1.

As a result, even if the rainwater remaining in the receptacle 19 passes through the fixing portion which fixes the rear outer panel 13 and the cover panel 18, the rainwater flows out of the cabin 1. Thus, the receptacle 19 and the compartment 11 are separated from each other in a watertight manner by a simple structure of spot-welding the second portion 13b of the rear outer panel 13 to the fourth portion 18b of the cover panel 18.

Consequently, water leakage from the receptacle 19 containing the window regulator 20 into the compartment 11 can be prevented without using a waterproof structure which has a special sealing member.

Further, with the above structure, the recess portion 21 of the rear outer panel 13 is covered by the cover panel 18, which defines a part of the outer shape of the cabin 1, so that the receptacle 19 is formed just under the rear window 6. Therefore, the receptacle 19 containing the window regulator 20 can be provided behind the cabin 1, without changing the basic appearance of the pickup truck T. In addition, water leakage from the receptacle 19 into the compartment 11 can be prevented without impairing the basic appearance of the pickup truck T.

The present invention is not limited to the above embodiments, but can be variously modified without departing from the gist of the invention. For example, the recess portion which defines the receptacle may be provided in the cover panel instead of the rear outer panel. In this case, the recess portion of the cover panel is protruded toward the loading platform and the receptacle is located outside the rear outer panel.

Further, the present invention is not only applicable to the rear window of a cabin, but may be applied to any other window having a windowpane, which is moved up and down by a window regulator.

Furthermore, the window regulator is not limited to the aforementioned structure in which the link mechanism having links coupled to form an X shape, but may be of any other structure.

Still further, the vehicle to which the present invention is applied is not limited to a pickup truck, but may be of any other kind of vehicle.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle, comprising:
a body member forming a cabin provided with a seat;
a first panel member, which is immovably fixed to the body member and provided separately from the seat, and defines a part of the outer shape of the cabin;
a second panel member, which is disposed to face the first panel member from outside of the cabin, the second panel member and the first panel member forming a receptacle therebetween; and
a window regulator contained in the receptacle,
wherein the first panel member includes a first portion which separates the cabin and the receptacle from each other, the first portion being recessed from outside of the cabin toward inside thereof and a second portion which separates inside and outside of the cabin from each other; and the second panel member is fixed to the first panel member so as to cover the first portion of the first panel member from outside the cabin.

2. The vehicle according to claim 1, wherein the first portion of the first panel member includes a recess portion, which is recessed into the cabin from the second portion, and the second panel member forms the receptacle in conjunction with the recess portion.

3. The vehicle according to claim 1, wherein the second panel member has a drainage hole which is open to the receptacle.

4. The vehicle according to claim 1, wherein the second portion of the first panel member surrounds the first portion.

5. A vehicle having a cabin and a loading platform, the vehicle comprising:
a body member forming the cabin;

a first panel member, which is immovably fixed to the body member and separates the cabin from the loading platform;

a second panel member, which is disposed to face the first panel member from a direction of the platform, the second panel member and the first panel member forming a receptacle therebetween; and a window regulator contained in the receptacle, wherein the first panel member includes a first portion which is recessed into the cabin, and a second portion surrounds the first portion; and the second panel member has a third portion that covers the first portion from a direction of the loading platform, thereby forming the receptacle between the third portion and the first portion, and a fourth portion fixed to the second portion.

6. The vehicle according to claim 5, wherein the third portion of the second panel member has a drainage hole which is open to the receptacle.

7. The vehicle according to claim 5, wherein the second portion of the first panel member separates inside and outside of the cabin from each other.

8. A vehicle including a cabin provided with a seat, comprising:

a first panel member defining the cabin, the first panel member being immovably fixed to the cabin, and provided behind the seat and separately from the seat;

a second panel member disposed facing the first panel member from outside of the cabin, the second panel member and the first panel member forming a receptacle therebetween; and a window regulator contained in the receptacle, wherein the first panel member includes a first portion recessed into the cabin, and a second portion disposed on a periphery of the first portion, and the second panel member is fixed to the second portion to cover the first portion of the first panel member from outside the cabin, whereby forming the receptacle between the second panel member and the first portion of the first panel member.

9. The vehicle according to claim 1, wherein the fixing portion which fixes the first panel member and the second panel member are positioned outside the cabin.

* * * * *